United States Patent [19]
Jaster et al.

[11] Patent Number: 5,648,873
[45] Date of Patent: Jul. 15, 1997

[54] PASSIVE SOLAR COLLECTOR

[75] Inventors: Paul A. Jaster, Arden Hills, Minn.; Mark Joseph O'Neill, Keller, Tex.

[73] Assignee: Minnesota Mining and Manufacturing Company, St. Paul, Minn.

[21] Appl. No.: 655,578

[22] Filed: May 30, 1996

[51] Int. Cl.$^6$ ............................................. G02B 17/00
[52] U.S. Cl. ..................... 359/591; 359/595; 359/597; 359/598
[58] Field of Search ........................... 359/591, 592, 359/593, 594, 595, 596, 597, 598

[56] References Cited

U.S. PATENT DOCUMENTS

| | | | |
|---|---|---|---|
| D. 364,469 | 11/1995 | Eijadi et al. | D25/52 |
| 2,812,692 | 11/1957 | Boyd | 88/60 |
| 3,290,850 | 12/1966 | Byrne, Jr. et al. | 52/630 |
| 3,809,461 | 5/1974 | Baumgardner et al. | 350/302 |
| 3,809,462 | 5/1974 | Baumgardner et al. | 350/302 |
| 3,826,562 | 7/1974 | Baumgardner et al. | 350/286 |
| 3,972,596 | 8/1976 | Baumgardner et al. | 350/286 |
| 4,022,186 | 5/1977 | Northrup, Jr. | 126/271 |
| 4,147,561 | 4/1979 | Knight | 136/206 |
| 4,329,021 | 5/1982 | Bennett et al. | 350/259 |
| 4,351,588 | 9/1982 | Zullig | 350/259 |
| 4,509,825 | 4/1985 | Otto et al. | 350/259 |
| 4,699,467 | 10/1987 | Bartenbach et al. | 350/259 |
| 4,772,094 | 9/1988 | Sheiman | 350/133 |
| 4,989,952 | 2/1991 | Edmonds | 350/259 |
| 5,027,566 | 7/1991 | Gilowski | 52/18 |
| 5,054,885 | 10/1991 | Melby | 359/618 |
| 5,099,622 | 3/1992 | Sutton | 52/200 |
| 5,117,811 | 6/1992 | Taylor | 126/428 |
| 5,118,543 | 6/1992 | McColl | 428/34 |
| 5,161,057 | 11/1992 | Johnson | 359/566 |
| 5,204,777 | 4/1993 | Curshod | 359/596 |
| 5,285,315 | 2/1994 | Stiles | 359/592 |
| 5,371,660 | 12/1994 | Levens | 362/145 |
| 5,408,795 | 4/1995 | Eljadi et al. | 359/592 X |
| 5,444,606 | 8/1995 | Barnes et al. | 362/340 |
| 5,467,564 | 11/1995 | DeKeyser et al. | 359/592 X |

FOREIGN PATENT DOCUMENTS

| | | | |
|---|---|---|---|
| 0 260 758 A3 | 3/1988 | European Pat. Off. | G03B 21/62 |
| 0 666 551 A1 | 9/1995 | European Pat. Off. | G08B 13/193 |
| 57-42002 | 3/1982 | Japan | G02B 3/00 |
| 84/00930 | 3/1984 | WIPO | B60R 1/08 |

*Primary Examiner*—Safet Metjahic
*Assistant Examiner*—D. P. Malley
*Attorney, Agent, or Firm*—Gary L. Griswold; Walter N. Kirn; Stephen Buckingham

[57] ABSTRACT

An apparatus designed to direct daylight through an aperture toward a target area in a building or other structure is disclosed. A housing provides a base attachable to the building and a support structure for supporting a reflector above the aperture. According to one embodiment of the invention the reflector is in the shape of an inverted cone. A light diffusing lens structure is disposed in the optical path between the reflector and the target area. In use, light is transmitted through the support structure, reflected from the surface of the reflector, and dispersed about the target area by the light diffusing lens structure.

18 Claims, 4 Drawing Sheets

PASSIVE SOLAR COLLECTOR

FIELD OF THE INVENTION

The present invention relates to optical systems for directing light through an aperture. More particularly, the present invention relates to an apparatus that directs daylight toward an aperture in the roof of a building.

BACKGROUND OF THE INVENTION

Solar collectors gather direct and limited ambient sunlight and direct it toward a target area. Active solar collector systems employ a mechanism for tracking the sun's trajectory across the sky to maximize the amount of sunlight collected. Active systems may be highly efficient solar collectors, however the required tracking mechanisms add complexity and expense to the system. By contrast, passive solar collector systems employ a fixed reflector system to direct light toward a target area. Passive systems are relatively less complex and less expensive, however passive systems are generally less efficient than active systems.

Daylighting systems are a particular type of solar collector which may be used to provide illumination for the interior of a building by directing daylight into the building. Daylight, as used in connection with the present invention, includes all forms of sunlight whether direct or ambient. Because of cost constraints, most daylighting systems are passive systems which employ fixed reflectors and/or refractors to direct daylight through an aperture into a building.

Ignoring, for the moment, the teachings of Copernicus, it is well known that the trajectory of the sun's path across the sky changes during the course of a year. For the purposes of the present invention, the solar altitude angle ($\beta$) shall be the angle between a straight line extending from an object on Earth to the sun (considered a point source) and the horizon. The solar azimuth angle ($\alpha$) is the angle between a straight line extending from the object to the sun and an imaginary north-south plane extending through the object. As a matter of convention, east is considered negative while west is considered positive. Solar azimuth and altitude angles vary widely in different geographic locations and during different seasons of the calendar year. However, most solar collectors are designed to accommodate only limited movement of the sun.

The simplest daylighting systems include windows and skylights. Skylights positioned on a flat roof surface are efficient solar collectors when the sun is disposed at high solar altitude angles, however their efficiency drops rapidly as the solar altitude angle drops because the effective aperture through which sun may pass decreases with the solar altitude. Vertical windows present an analogous problem. To compensate for this effect, daylighting systems typically incorporate reflectors or refractors designed to direct low solar altitude angle sunlight into the building.

SUMMARY OF THE INVENTION

The present invention provides an efficient solar collector suitable for use in daylighting applications. In accordance with the present invention, there is provided an apparatus for directing sunlight through an aperture in a structure, preferably a building. In one aspect, the apparatus includes a passive reflector assembly for reflecting sunlight toward the target area, a light spreading assembly displaced from the passive reflector assembly for spreading light reflected from said passive reflector assembly, and a support structure for holding the passive reflector assembly in a fixed spatial relationship with the light spreading assembly such that a first portion of the sunlight incident on the apparatus is reflected from the passive reflector assembly through the aperture toward the light spreading means.

The passive reflector assembly has an upper portion that extends through an arc having a radius of curvature $R_1$ and a lower portion that extends through an arc having a radius of curvature $R_2$, less than $R_1$. When viewed in cross-section from above, the reflector assembly may be in the shape of a circle having a constant radius. Alternatively, the reflector assembly may be in the shape of an ellipse having a major radius and a minor radius. Alternatively, the reflector assembly may comprise a plurality of straight segments approximating a curved surface. Preferably, the passive reflector assembly includes a reflective surface in the shape of cone, or pyramid, with the apex of the cone pointing toward the aperture. The reflective surface may be coated with a specularly reflective substance or, alternatively, may include an array of linear prisms that reflect light according to the principles of total internal reflection.

The light spreading assembly is displaced from the passive reflector structure. Preferably, the light spreading assembly is disposed between the passive reflector assembly and the target area inside the building. In one embodiment of the invention, the light spreading assembly includes a light diffusing lens for spreading light transmitted through the aperture to provide illumination for the interior of the building.

The support structure maintains the reflector assembly in a fixed spatial relationship with the light spreading assembly such that light incident on the reflector assembly is reflected toward the light spreading assembly. In one embodiment of the invention, the support structure includes a base suitable for attachment to a building structure and a substantially optically transparent housing extending from the base. Preferably, the passive reflector assembly is supported by the housing.

Features of the present invention are pointed out with particularity in the appended claims. However, reference should be had to the drawings and the accompanying descriptive matter in which preferred embodiments of the invention are illustrated and described.

DETAILED DESCRIPTION

The present invention provides an apparatus designed to direct daylight through an aperture in a building and toward a target area inside the building. One embodiment of the invention comprises a housing that has a base adapted for attachment to a building and a substantially optically transparent support structure. An inverted conical reflector is held in place above the aperture by the support structure. A light diffusing lens is positioned adjacent the aperture. In use, light incident on the conical reflector is redirected through the aperture and the light diffusing lens and is distributed around the target area in the building.

Figure 1:
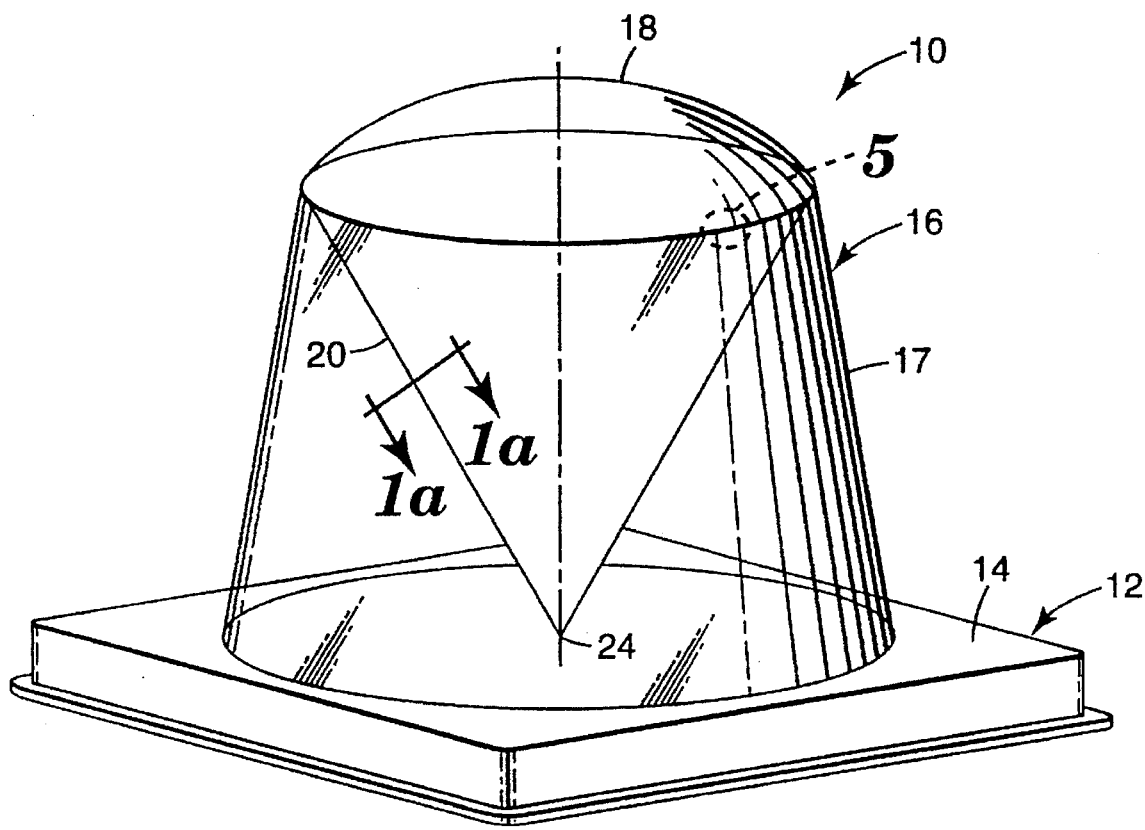
FIG. 1 is a perspective view of one embodiment of an apparatus in accordance with principles of the present invention.

FIG. 1 is a perspective view of one embodiment of an apparatus 10 in accordance with principles of the present invention. The apparatus depicted in FIG. 1 is designed to be placed on the roof of a structure and, as such, should preclude rain, snow, or other unwanted elements from passing through the aperture into the building.

As illustrated in FIG. 1, the apparatus 10 includes a housing 12 having a base 14 and a support structure 16 extending from base 14. Base 14 is preferably adapted to mate with an opening in the roof of the building. Base 14 is substantially rectangular in shape, however it will be appreciated by one of ordinary skill in the arts that base 14 could be manufactured in different shapes. Preferably, base 14 and support structure 16 are manufactured as integral components. However, it will be appreciated that base 14 could be manufactured as separate components and assembled using conventional mechanical or adhesive techniques.

Figure 2:
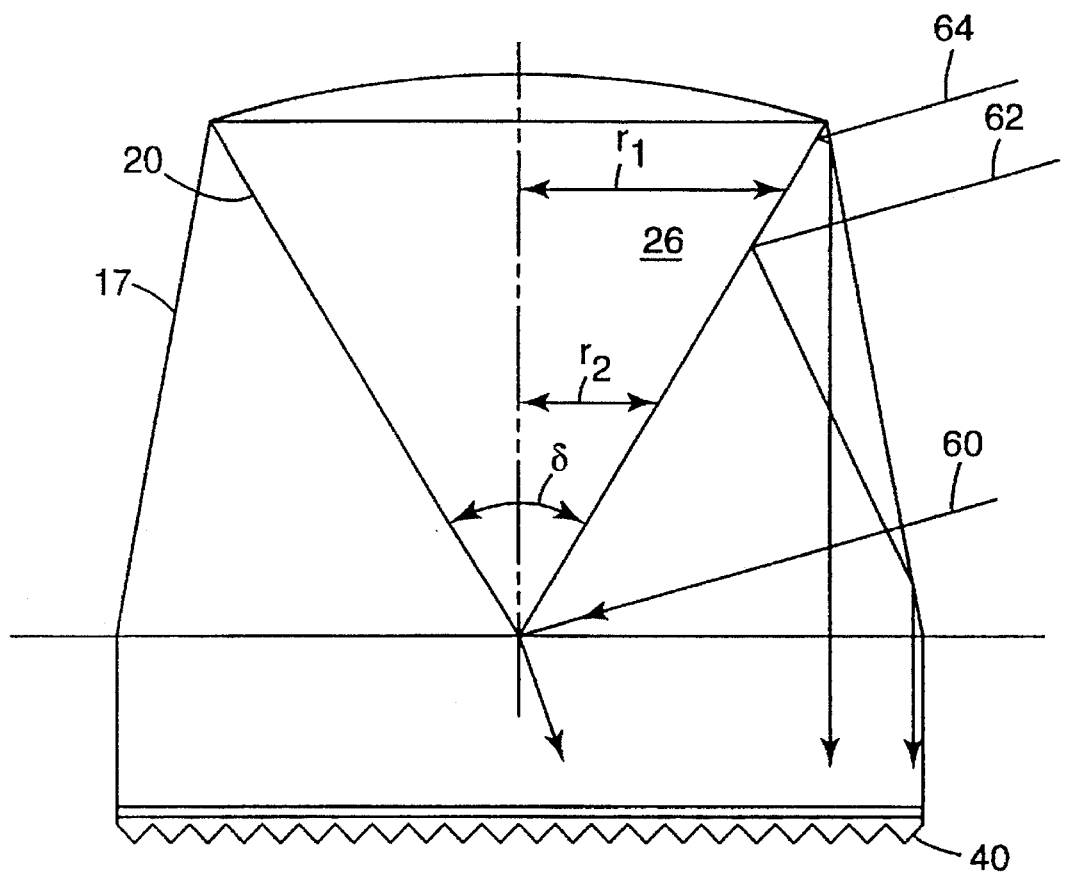
FIG. 2 is a vertical cross-sectional view of a solar collector in accordance with aspects of the present invention.
Figure 3:
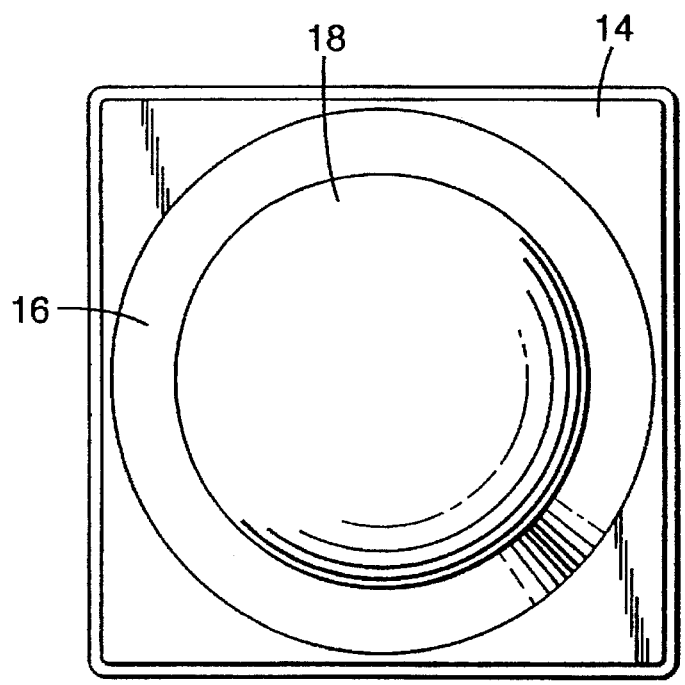
FIG. 3 is a top view of a solar collector in accordance with aspects of the present invention.

Support structure 16 extends from base 14 and preferably includes a dome-shaped cover 18 which allows objects such as rain, snow, or other debris which may fall onto support structure 16 to slide off from support structure 16. In a preferred embodiment, support structure 16 is a substantially frusto-conical structure that is circular when viewed in a horizontal cross-section (FIG. 3) and is substantially frusto-conical when viewed in a vertical cross-section (FIG. 2). Wall 17 of support structure 16 rises from base 14 at an angle of approximately 80 degrees from horizontal (e.g. 10 degrees from vertical). In one embodiment, wall 17 of support structure has a substantially smooth exterior surface and a substantially smooth interior surface. However, one of ordinary skill in the optical arts will recognize that the surfaces of wall 17 could be modified to alter their optical properties. For example, wall 17 could be coated with optical thin films. Alternatively, microstructures could be formed into wall 17 to alter the path of light rays passing through wall 17.

According to one embodiment of the invention, support structure 16 measures approximately 63 inches (160.0 centimeters) in diameter at its base, 48 inches (121.9 centimeters) in diameter at its top, and 42 inches (106.7 centimeters) in height from base to top. Base 14 measures approximately 65 inches (165 centimeters) by 65 inches (165 centimeters). However, these dimensions are merely exemplary and not meant to be limiting. One of ordinary skill in the art will recognize that scaling the housing up or down would constitute merely an insubstantial change in housing 12.

Housing 12 is preferably manufactured as an integral (e.g. unitary) structure. Suitable materials should be sufficiently rigid to withstand environmental stresses such as wind and precipitation and relatively strong. Additionally, preferred materials should be optically transmissive and should maintain their optical transmissivity when exposed to the elements over time. Suitable materials include polycarbonate, acrylic, polyethylene, and glass. Housing 12 may be manufactured using conventional molding techniques known to those of skill in the art. Suitable manufacturing methods include vacuum forming, casting, cold forming sheets, injection molding, blow molding or other thermal processes.

One of ordinary skill in the art will recognize that insubstantial changes made to various attributes of housing 12 would not change the function of housing 12. For example, base 14 of housing 12 could be formed in a different shape. Additionally, the shape of support structure 16 is not critical and thus support structure 16 could be formed in a different shape (e.g. a pyramid, a cylinder, a dome, etc.). While support structure 16 is preferably formed from a substantially optically transmissive material, one of ordinary skill in the art will recognize that portions of support structure 16 could be formed from opaque materials with discrete optically transmissive apertures formed therein. These modifications, as well as other insubstantial changes, should be considered within the scope of the appended claims.

Referring again to FIG. 1, a reflector 20 is suspended from support structure 16. According to one embodiment of the invention, reflector 20 is a substantially conical reflector suspended in an inverted position such that its apex 24 faces an aperture in a structure. Reflector 20 defines a exterior surface 26 and an interior surface 28. Interior surface 28 may be coated with a reflective material 27 (e.g. silver, aluminum) to form a reflector 20 (FIG. 1b). Alternatively, exterior surface 26 may be painted or otherwise coated with a reflective material 27 to form a reflector 20 (FIG. 1c). Preferably, reflector 20 is a specular reflector, however the present invention is intended to cover diffuse reflectors. Suitable materials for forming reflector 20 include ECP-305 or SA-85 reflective films commercially available from the 3M Company, St. Paul, Minn.

Figure 1A:
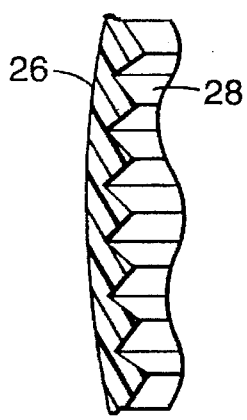
FIGS. 1a–1c are cross-sectional views of reflective surfaces in accordance with the present invention.
Figure 1B:
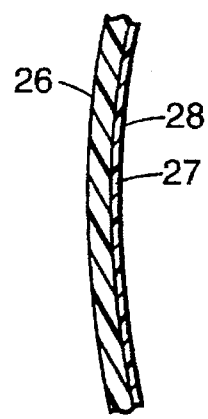
Figure 1C:
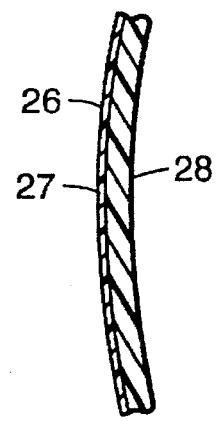

In yet another embodiment, interior surface 28 of reflector 20 may include an array of linear prisms such that reflector 20 reflects light according to the principles of total internal reflection (FIG. 1a). Preferably, the prisms extend longitudinally from the apex 24 of reflector 20 to the reflector base. This embodiment is discussed in greater detail below.

Reflective surface 26 of reflector 20 preferably subtends an arc of 360 degrees. While advantages of the present invention may be achieved with a reflective surface that subtends an arc substantially less than 360 degrees, an arc of less than 160 degrees is not recommended and an arc of at least 240 degrees is desirable. Numerous other insubstantial modifications to reflector 20 will be obvious to one of ordinary skill in the optical arts. For example, reflector 20 could be formed with an elliptical or polygonal horizontal cross-section. Additionally, reflective surface 26 could be curved, either concavely or convexly, in a vertical cross-section.

Referring to FIG. 2, according to one embodiment, reflective surface 26 of reflector 20 forms an angle of approximately 30 degrees relative to an axis extending through the peak of reflector 20. Stated otherwise, reflector 20 forms a cone angle $\delta$ of approximately 60 degrees. However, it will be appreciated by one of ordinary skill in the optical arts that the cone angle $\delta$ defined by reflective cone 20 may vary depending upon the particular requirements of different daylighting applications. For example, it may be advantageous to use a reflective cone having a larger cone angle $\delta$ in daylighting applications at high latitudes.

An important aspect of the present invention is the provision, in a solar collector, of a reflector 20 having a geometry such that the upper portion of reflector 20 extends through an arc having a radius of curvature, $R_1$ and the lower portion extends through an arc having a radius of curvature $R_2$, that is less than $R_1$. It will be understood that reflective surface 26 need not be curvilinear to meet this criteria. For example, a polygonal surface, when viewed in cross-section, may be characterized as extending through an arc.

The mechanism for suspending reflector 20 from support structure 16 is not critical to the present invention; reflector 20 may be suspended from support structure using any number of conventional suspension mechanisms or adhesive bonding techniques. Alternatively, reflector 20 may be formed as an integral part of housing 10.

A light diffusing lens structure 40 is suspended beneath housing 12 between reflector 20 and the target area in the building such that light reflected from reflector 20 passes through the light diffusing lens structure 40 and is distributed by the light diffusing lens structure 40. The exact location of light diffusing lens structure 40 is not critical to the present invention. The principal criteria is that light diffusing lens structure 40 must be displaced from reflector 20 and disposed in the optical path between reflector 20 and the target area in the building. It will be appreciated by one of ordinary skill in the art that the diffusing lens structure 40 need not be physically connected with housing 12. For example, in some applications, it may be advantageous to position diffusing lens structure 40 at a point displaced from housing 12.

The particular structure of the diffusive lens structure 40 is not critical to the present invention. Any suitable diffusive lens structure may be used in a daylighting system in accordance with the present invention. A wide variety of diffusive lighting panels are commercially available. Examples include Prismatic Light Controlling Lenses commercially available from ICI Acrylics, St. Louis, USA, and Daylighting Radial Lens commercially available from 3M Company, St. Paul, USA. Other suitable diffusers include diverging lenses, fresnel lenses, diverging radial lenses, and diverging linear lenses.

Having described aspects of the physical structure of one embodiment of a solar collector in accordance with principles of the present invention, various advantages and features of the present invention will be described below in connection with a discussion of the operating principles of the solar collector.

In use, a solar collector in accordance with principles of the present invention is preferably positioned adjacent an opening, or aperture, in the roof of a building. Referring again to FIG. 2, the solar collector is preferably positioned such that conical reflector 20 is centered about an axis that extends through the aperture. Daylight, both ambient and direct, incident on the reflective surface 26 of reflector 20 is redirected through the aperture and toward the target area in the building. The light reflected by conical reflector 20 passes through diffusive lens structure 40, which disperses the light throughout the target area, thereby providing more uniform illumination.

Figure 4:
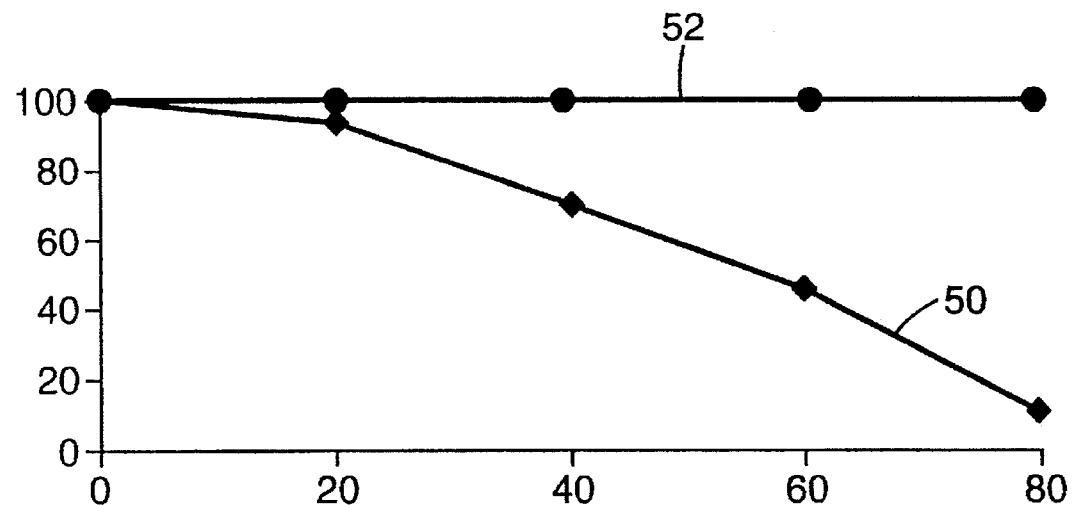
FIG. 4 is a graph of the effective aperture of the reflective surface of a reflector assembly in accordance with the present invention as a function of the solar azimuth angle.

It will be appreciated that conical reflector 20 provides a constant effective aperture for reflective surface 26 independent of the solar azimuth angle, $\alpha$. The effective aperture of a reflective surface may be defined as the projection of the reflective surface onto a plane perpendicular to the axis of incidence (e.g. the axis of the sun's rays). The effective aperture of a planar reflective surface decreases by the cosine of the incidence angle of solar light (measured from a normal axis) to the reflective surface. This is illustrated by line 50 in FIG. 4, which plots the reduction in the effective aperture of a south-facing planar reflector tilted at thirty degrees as a function of the solar azimuth angle, $\alpha$. FIG. 4 assumes a constant solar altitude angle of 10 degrees. The vertical axis represents the percentage of reflective surface area available to reflect light and the horizontal axis represents the solar azimuth angle in degrees from due south.

Because reflector 20 is symmetrical when rotated about a vertical axis extending through the center of the reflector, the effective aperture of conical reflector 20 remains constant independent of the solar azimuth angle. This is illustrated in FIG. 4, wherein line 52 demonstrates that 100 percent of the effective aperture of conical reflector 20 is available for collecting light independent of the solar azimuth angle. Thus, one aspect of a preferred embodiment of the present invention is the use of a reflector that is symmetrical when rotated about a vertical axis extending through the center of the reflector to provide a constant effective aperture for collecting light. Conical reflector 20 is one embodiment of a reflector geometry that meets this criteria. However numerous other geometries exist that meet this criteria. For example, a multi-faceted (e.g. polygonal) pyramid is symmetrical when rotated about a vertical axis. Additionally, reflectors that are elliptical in cross-section closely approximate a symmetrical reflector.

Another feature of the present invention is that support structure 16 is preferably designed to cooperate with conical reflector 20 to reflect sunlight toward the target area. More particularly, wall 17 of support structure 16 is disposed at an angle with respect to a vertical axis to increase the amount of light directed through the aperture into the building. The formula for determining the percentage of light reflected from the interior surface of support structure 16 by first surface reflection is as follows:

$$\text{Percent Reflected} = \frac{1}{2} \left[ \frac{\sin^2(\Theta_2 - \Theta_1)}{\sin^2(\Theta_2 + \Theta_1)} + \frac{\tan^2(\Theta_2 - \Theta_1)}{\tan^2(\Theta_2 + \Theta_1)} \right]$$

Where $\Theta_1$ is the incidence angle at which a light ray strikes the interior surface of support structure 16 and $\Theta_2$ is the angle of refraction of the portion of the light ray that propagates through support structure 16. Assuming angle $\Theta_1$ is known, angle $\Theta_1$ may be calculated from Snell's law as follows:

$$\Theta_2 = \sin^{-1}\left( \frac{\eta_1 \sin\Theta_1}{\eta_2} \right)$$

Where $n_1$ represents the index of refraction of air and $n_2$ is the index of refraction of the material from which support structure 16 is formed. The net effect is that tilting wall 17 of support structure 16 at an angle with respect to a vertical axis increases the incidence angle at which light rays reflected from conical reflector 20 strike the interior surface of wall 17. Accordingly, a greater percentage of these light rays are reflected from the surface of support structure 16 toward the aperture.

FIG. 2 provides an illustrative example. Referring again to FIG. 2, light rays 60, 62, and 64 represent the trajectory of three light rays incident on reflector 20 at a solar altitude of 10 degrees. Assuming the cone angle $\delta$ of conical reflector 20 measures 60°, a light ray at a 10° solar altitude angle is incident on reflector 20 at an incidence angle of 40° from an axis normal to the surface of reflector 20. Accordingly, light rays 60, 62, 64 will be reflected along an axis disposed at 40° from an axis normal to the surface of reflector 20, or 20 degrees from a vertical axis. Light ray 60 illustrates the trajectory of a limiting light ray that strikes the lowermost surface (e.g. apex 24) of reflector 20. Light ray 64 illustrates the trajectory of a limiting light ray that strikes the uppermost surface of reflector 20. Light ray 62 represents an intermediate light ray.

It will be apparent from FIG. 2 that light rays incident on the surface of conical reflector 20 in the space between ray 62 and 64 are reflected from reflector 20 and onto the interior surface of support structure 16. As discussed above, these light rays are reflected from reflector 20 along a trajectory that is displaced from a vertical axis by approximately 20 degrees. Because support structure 16 is displaced from vertical by 10 degrees, the reflected light rays strike the interior surface of support structure 16 at an 80 degree angle of incidence. Support structure 16 reflects a majority of the light incident on its surface at an 80 degree angle of incidence. One of ordinary skill in the optical arts will recognize that support structure 16 could be disposed at a greater or lesser angle relative to a vertical axis to accommodate reflectors having different cone angles.

Figure 5:
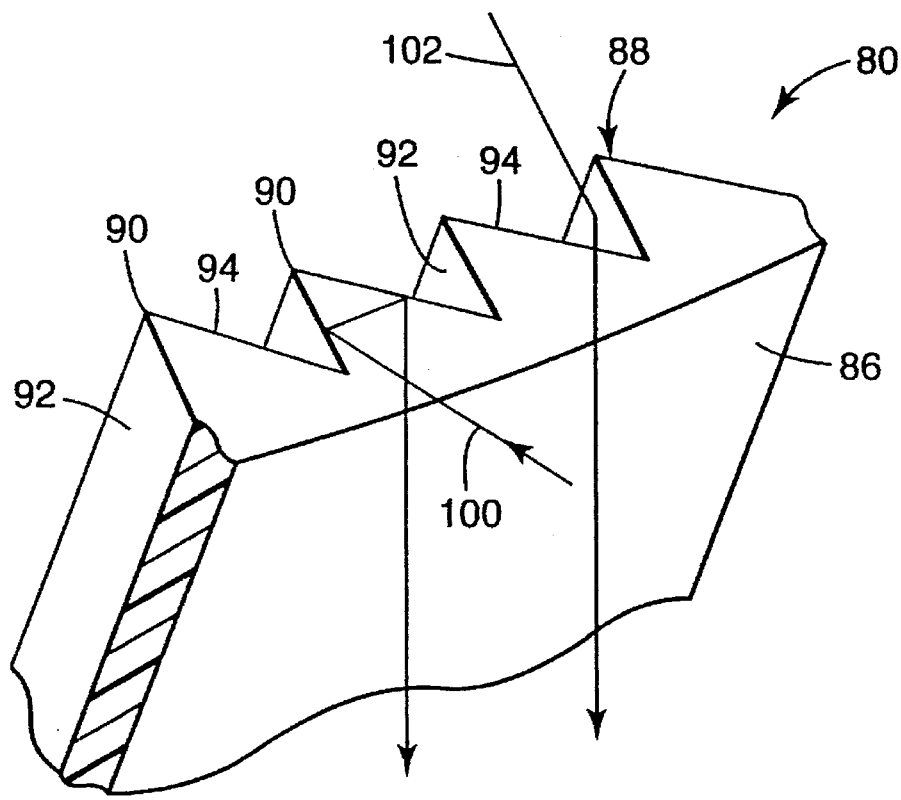
FIG. 5 is a perspective view of a portion of reflective surface in accordance with aspects of the present invention.

FIG. 5 depicts a portion of a reflector 80 in accordance with an alternate embodiment of the present invention. Reflector 80 defines a substantially smooth exterior surface 86 and an inner surface 88 which comprises a plurality of linear prism elements 90, each having a first face 92 and a second face 94. The prisms preferably form an included angle of approximately 90 degrees. Preferably, prism elements 86 extend substantially linearly from the peak of the reflector to the base of the reflector. An important advantage associated with this embodiment of reflector 80 is that prisms provide a reflector that reflects light incident on the system at low solar altitudes according to the principles of total internal reflection and transmits light incident on the system at high solar altitudes.

Figure 6A:
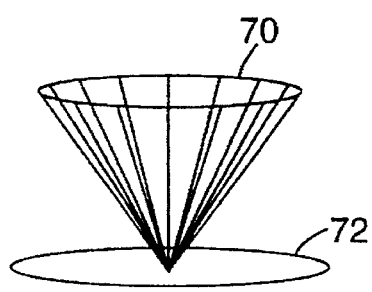
FIGS. 6a–6h illustrate the effective surface area of one embodiment of a reflector in accordance with aspects of the present invention available for collecting light at varying solar altitude angles.
Figure 6B:
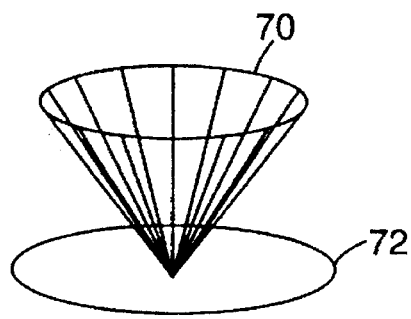
Figure 6C:
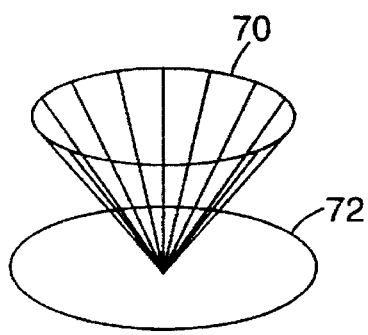
Figure 6D:
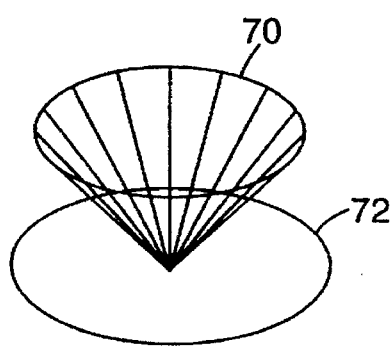
Figure 6E:
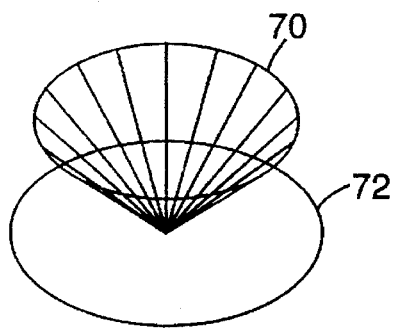
Figure 6F:
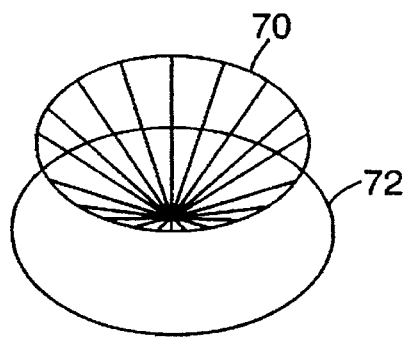
Figure 6G:
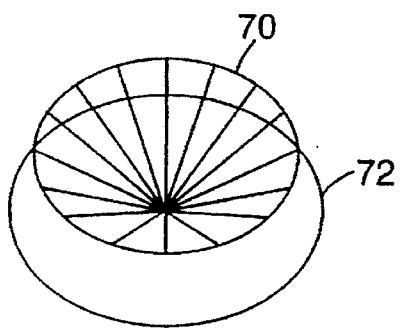
Figure 6H:
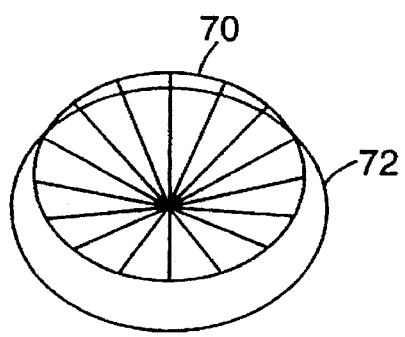

FIGS. 6a–6h illustrate the importance of this feature of the invention. FIG. 6a is a schematic view of a conical reflector 70 disposed above an aperture 72, consistent with principles of the present invention, viewed from the perspective of a 10 degree solar altitude angle. Thus, FIG. 6a illustrates the effective aperture of reflector 70 available for directing light through aperture 72. It will be apparent from FIG. 6a that a large percentage of the reflective surface of reflector 70 is available to reflect light incident on the solar collector at low solar altitude angles. It will also be noted from FIG. 6a that some light rays are able to pass directly through aperture 72. However, the effective aperture of aperture 72 is small for low solar altitude angle light.

FIGS. 6b–6h schematically illustrate the changes in effective apertures at 10 degree increments, beginning with a solar altitude of 20 degrees. It will be apparent that as the solar altitude angle increases, the effective aperture of reflector 70 decreases rapidly. By contrast, the effective aperture of aperture 72 increases with increasing solar altitude angles. However, a large percentage of the area of aperture 72 is blocked by conical reflector 70, which reduces the efficiency of the solar collector, particularly in environments of high solar altitudes.

Referring again to FIG. 5, light ray 100 represents a light ray incident on the system at a low solar altitude angle (e.g. 10 degrees). Light ray 100 is refracted through exterior surface 86 and is reflected prism faces 92, 94 toward according to Snell's law. By contrast, light ray 102 represents a light ray incident on the solar collector at a high solar altitude angle (e.g. greater than 50 degrees). Light ray 102 is incident on the prism side of conical reflector 80 and is transmitted through conical reflector 80. Thus, in use low solar altitude light is reflected and high solar altitude angle light is transmitted through conical reflector 80. This reduces light loss attributable to the reflector blocking light rays incident on the solar collector at high solar altitude angles.

As discussed above, reflector 80 is preferably formed from a material having an array of 90 degree linear prisms on one surface thereof. A suitable material for forming reflector 80 is Optical Lighting Film commercially available from 3M Company in St. Paul, U.S.A. Reflector 80 can be formed by laminating triangular-shaped sections of the prismatic material to an optically clear substrate that can be formed in the shape of reflector 80.

It is to be understood that even though numerous characteristics and advantages of the present invention have been set forth in the foregoing description, together with the details of one preferred apparatus used to practice the present invention, the disclosure is merely illustrative. Insubstantial changes calculated produce substantially the same result are to be considered within the scope of the present invention. Accordingly, the present invention is to be limited only by the appended claims.

What is claimed is:

1. An apparatus for directing sunlight through an aperture in a structure toward a target area, comprising:

passive reflector means for reflecting sunlight toward said target area, said passive reflector means having an upper portion that extends through an arc having a radius of curvature $R_1$ and a lower portion that extends through an arc having a radius of curvature $R_2$, less than $R_1$, light spreading means displaced from said passive reflector means for spreading light reflected from said passive reflector means; and support means for holding said passive reflector means in a fixed spatial relationship with said light spreading means such that a first portion of the sunlight incident on said apparatus is reflected from said passive reflector means toward said light spreading means and through said aperture.

2. An apparatus according to claim 1, wherein:

said passive reflector means is positioned to receive direct sunlight.

3. An apparatus according to claim 1, wherein:

said passive reflector means comprises a reflective surface that subtends an angle of at least 180 degrees.

4. An apparatus according to claim 1, wherein:

said passive reflector means comprises a reflective surface that subtends an angle of 360 degrees.

5. An apparatus according to claim 1, wherein:

said passive reflector means comprises a specularly reflective coating.

6. An apparatus according to claim 1, wherein:

said passive reflector means comprises an array of linear prisms.

7. An apparatus according to claim 1, wherein:

said passive reflector means comprises a substantially conical reflector oriented such that its peak faces said light spreading means.

8. An apparatus according to claim 1, wherein:

said passive reflector means comprises a substantially frusto-conical reflector oriented such that its peak faces said light spreading means.

9. An apparatus according to claim 1, wherein:

said passive reflector means comprises a multi-sided reflector oriented such that its peak faces said light spreading means.

10. An apparatus according to claim 1, wherein:

said light spreading means comprises a light diffuser.

11. An apparatus according to claim 1, wherein:

said light spreading means comprises a diverging lens.

12. An apparatus according to claim 1, wherein:

said light spreading means comprises a diverging fresnel lens.

13. An apparatus according to claim 1, wherein:

said light spreading means comprises a diverging linear lens.

14. An apparatus according to claim 1, wherein:

said light spreading means comprises a diverging radial lens.

15. An apparatus according to claim 1, wherein:

said support means comprises a housing formed from a substantially optically transparent material.

16. An apparatus according to claim 15, wherein:

said housing has a base having a radius R1 and a top having a radius R2, less than R1.

17. An apparatus according to claim 11, wherein:

the ratio of R1:R2 is between 1.05:1 and 1.5:1.

18. An apparatus for directing daylight through an aperture into a building, comprising:

a housing having a base attachable to the building and a support structure formed from a substantially optically transparent material extending from the base;

an optical reflector assembly having a base secured to the support structure, the optical reflector assembly comprising a reflective surface having an upper portion that extends through an arc having a radius of curvature $R_1$ and a lower portion that extends through an arc having a radius of curvature $R_2$, less than $R_1$, and a light spreading lens disposed adjacent the bottom surface of said housing, such that daylight incident on the system at solar altitude angles between about 0 and 50 degrees is transmitted through the optically transparent housing, strikes a portion of the reflective surface of the conical reflector, and is directed through the light spreading lens toward and into the building.

* * * * *